Jan. 13, 1959   A. H. WAKEMAN   2,867,994
REFRIGERATION APPARATUS
Filed Dec. 14, 1955   3 Sheets-Sheet 1
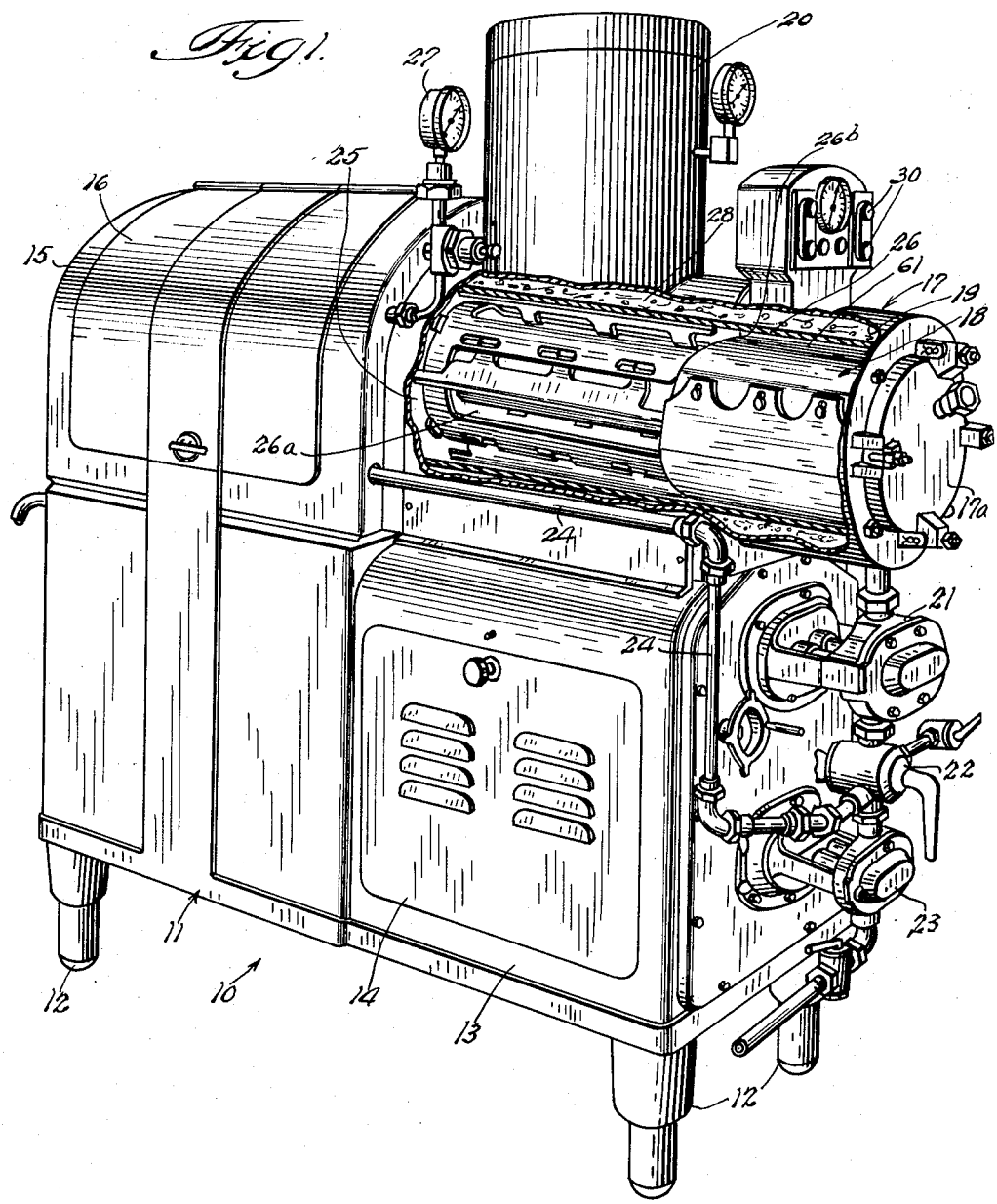
INVENTOR.
Alden H. Wakeman
BY
Thiess, Olson, Mecklenburger, van Holst, & Coltman

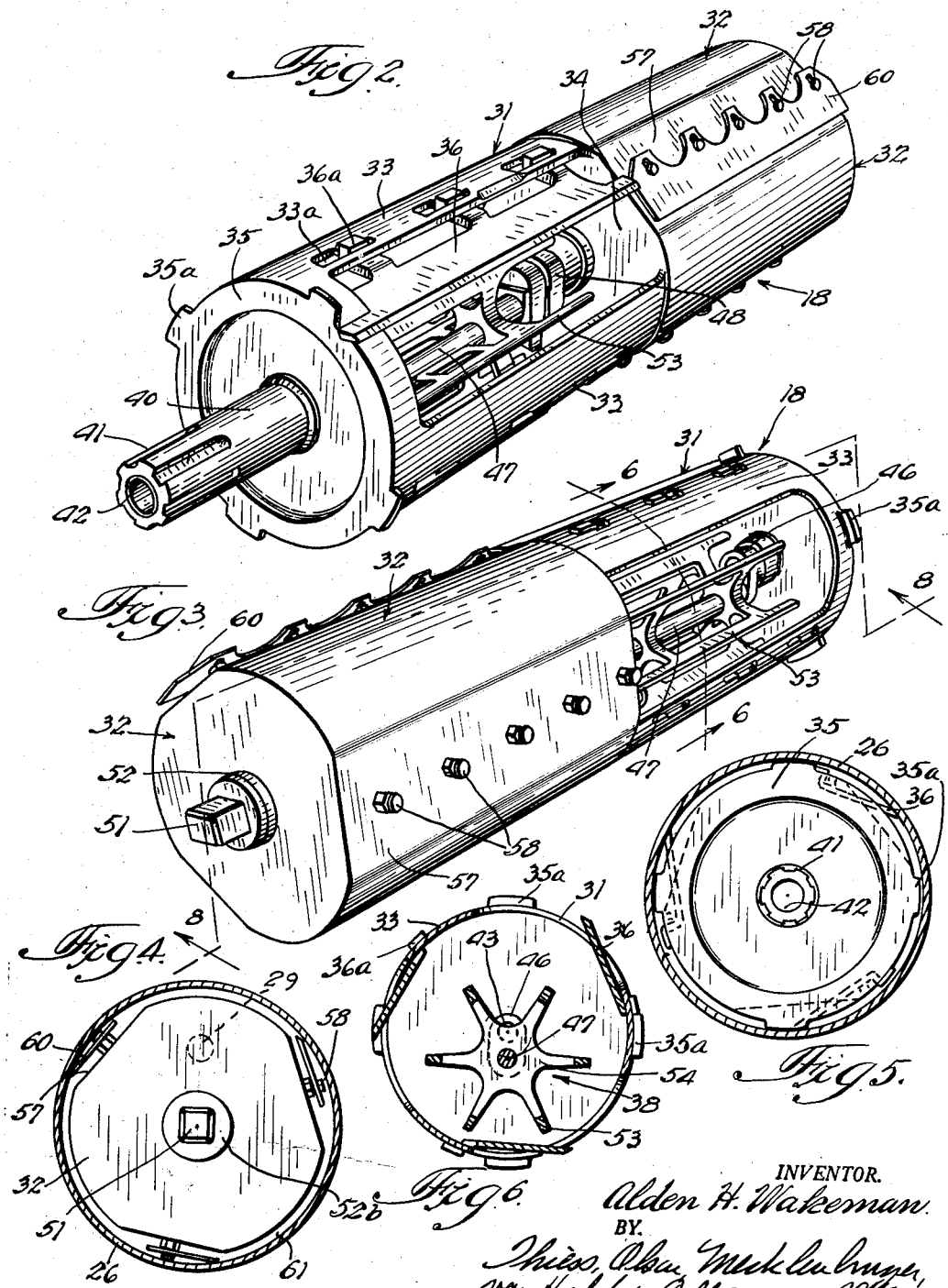

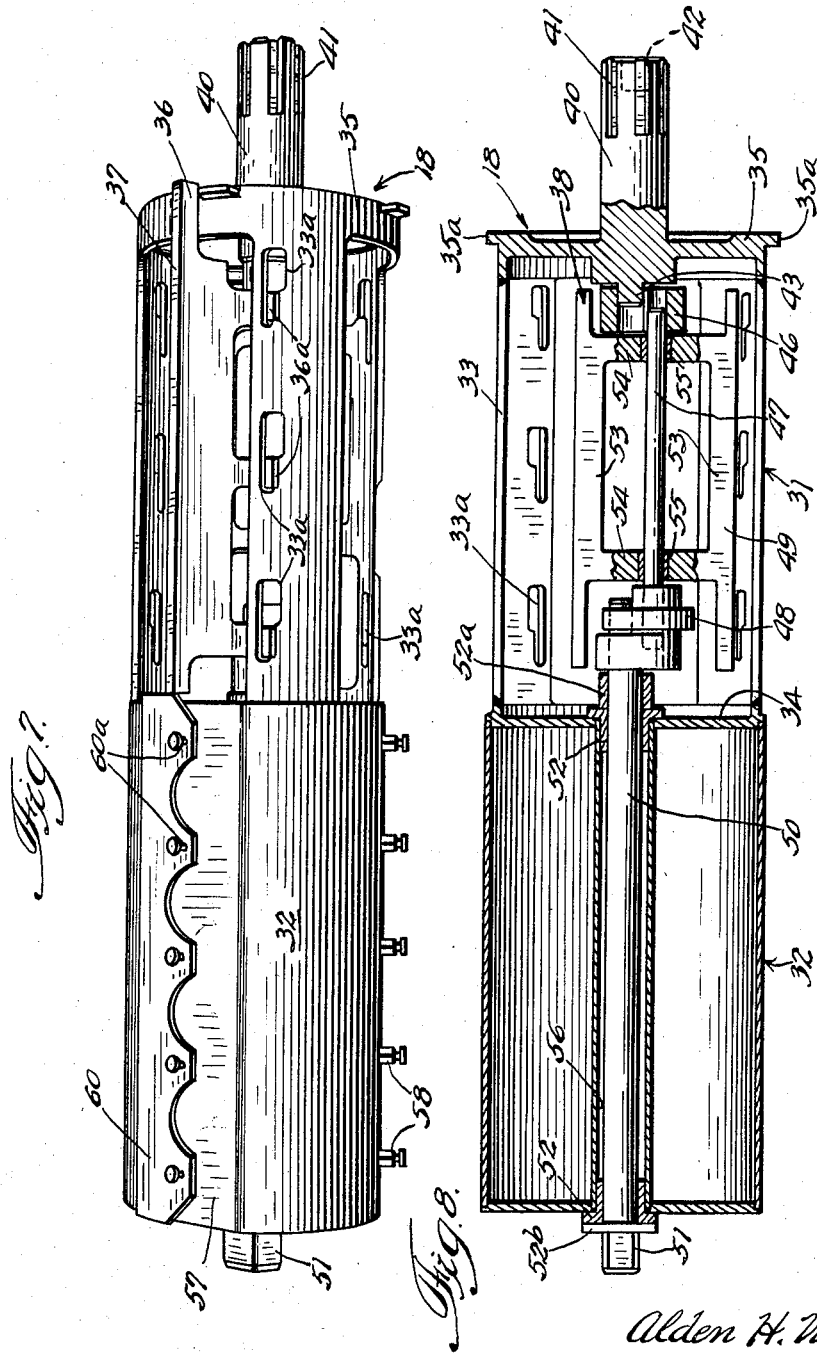

United States Patent Office 2,867,994
Patented Jan. 13, 1959

2,867,994

REFRIGERATION APPARATUS

Alden H. Wakeman, Lakemills, Wis., assignor to The Creamery Package Mfg. Company, Chicago, Ill., a corporation of Illinois Application December 14, 1955, Serial No. 553,042

4 Claims. (Cl. 62—343)

This invention relates to refrigeration apparatus and more particularly to a method and apparatus for the commerical production of ice cream or other frozen confections wherein accurate control of the overrun factor in the resultant product is of utmost importance.

Various apparatus and methods for the continuous production of such products, wherein the incorporation of air or other fluid therein is required, have heretofore been proposed which, however, are possessed of one or more infirmities detracting materially from the practical or utilitarian values of such methods or apparatus. One such infirmity, for example, is that the air or fluid incorporation within the product is not accurately controlled, thereby resulting in an end product of nonuniform texture and frequently possessed of an unpalatable character. A second infirmity is that excessive whipping of the product during processing thereof in order to effect proper aeration, is oftentimes required because the product is not within an optimum temperature range for the incorporation of air or fluid therein. A third infirmity stems from such excessive whipping in that protein destabilization of the product is likely to occur which also adversely effects the palatable nature of the product. A fourth infirmity which is associated with certain prior methods and apparatus is that the product is vigorously agitated and aerated just prior to being removed from the apparatus with the result that the product is not of uniform temperature when leaving the apparatus, and, thus, causes poor overrun control thereof and inability of the proteins contained in the product to properly retain a predetermined amount of moisture. Lastly, numerous prior apparatus and methods are not readily capable of producing both relatively hard and relatively soft frozen products with a controlled amount of air incorporation.

Thus, it is the object of this invention to provide a method and apparatus for the production of ice cream or other frozen confections which successfully overcomes the infirmities above noted.

A further object of the invention is that the improved apparatus may be readily incorporated in various size and types of equipment currently in use.

Further and additional objects will appear from the description, accompanying drawings, and appended claims.

In accorance with one embodiment of this invention, an elongated refrigerated cylindrical chamber is provided which is composed of two serially connected compartments. Adjacent one end of the first compartment is an inlet for the product to be processed. A second inlet for compressed fluid is provided in the first compartment adjacent said one end thereof but in spaced relation with respect to the product inlet. The second compartment is provided with an outlet for the processed product. Rotatably mounted within the interior of the chamber is an elongated member or dasher having a skeletal first portion disposed within the first compartment and adapted to agitate and aerate the product introduced into said compartment. Simultaneously with the agitating and aerating of the product, the temperature of the latter is reduced to within a range wherein optimum incorporation of the fluid in the product will occur by reason of the chamber being refrigerated. The second portion of the dasher is coaxially aligned with the first portion and is disposed within the second compartment of the chamber. The peripheral surface of the dasher second portion is imperforate and spaced from the interior of the second compartment so as to form a passageway of relatively small cross-sectional area through which the aerated product is caused to pass. Mounted on the periphery of the dasher second portion and extending angularly therefrom into the passageway is an elongated scraper blade which prevents adhesion of the product to the interior of the second compartment. By reason of the small cross-sectional area of the passageway, the product passing therethrough will be uniformly cooled to a lower temperature prior to being removed from the chamber through the outlet and, thus, the overrun of the product may be accurately controlled. The amount of refrigeration and the time the product will remain in each compartment will vary according to the variety of the product to be processed. For a more complete understanding of the invention, reference should be made to the drawings wherein:

Fig. 1 is a perspective view of a continuous freezer for ice cream and other frozen confections and having portions of the freezer broken away to disclose the improved dasher construction;

Fig. 2 is an enlarged perspective view of the improved dasher as viewed from the skeletal end thereof;

Fig. 3 is similar to Fig. 2 but viewed from the opposite end of the dasher;

Fig. 4 is a left end view of the dasher, as seen in Fig. 3, and showing the refrigerated chamber in section;

Fig. 5 is similar to Fig. 4 but of the opposite end of the dasher;

Fig. 6 is a sectional view taken along line 6—6 of Fig. 3;

Fig. 7 is a side elevational view of the improved dasher, and

Fig. 8 is a sectional view taken along line 8—8 of Fig. 3.

Referring now to the drawings and more particularly to Fig. 1, a continuous freezer 10 for ice cream or other similar frozen confections is shown which is adapted for use primarily in commercial dairies and the like. The freezer in this instance comprises a frame 11 supported at its corners by legs 12. Mounted on the frame is a lower housing section 13 in which is disposed motors, pumps, compressors, etc., not shown, which are adapted to operate various parts of the apparatus to be hereinafter described. The housing section 13 is provided with a removable door 14 on each side thereof to permit access to such parts for the purposes of maintenance and adjustment thereof. The upper part of the apparatus is provided with a rear upper hood section 15 in which is disposed the drive shaft, supply lines, etc., not shown, and various other parts of the apparatus. Hood section 15 is provided with a removable cover 16 to permit access to the interior thereof. Disposed forwardly of hood section 15 and above housing section 13 is a forwardly extending freezer cylinder section 17 in which is disposed a dasher 18. The cylinder section 17 is provided with a removable end plate 17a to permit cleaning of the interior thereof when required and to support an end of the rotating dasher 18. Cylinder section 17 is provided with an outer jacket 19 from which extends upwardly a tank 20 for effecting liquid and gas separation. The refrigerant circulates within a passageway 28 formed between the outer jacket 19 and the sleevelike chamber 26. The front end of the cylinder section 17 overhangs lower housing section 13. Disposed beneath the overhanging portion of section 17 is a pump 21 which effects discharge of the processed product from the interior of chamber 26. Beneath pump 21 is an outlet valve 22 which is adapted to direct the processed product to any subsequent apparatus such as a packaging machine or the like. Located below valve 22 is a second pump 23 which is adapted to direct the raw product, such as ice cream mix, through suitable piping 24 to the rear end 25 of the interior of chamber 26. The chamber 26, as heretofore mentioned, is enveloped by circulating refrigerant. The interior of chamber 26 is formed into two interconnected compartments 26a and 26b by the dasher 18 which is disposed therein. Movement of the dasher 18, to be described more fully hereinafter, is controlled by switches 30 which are mounted above the forward end of cylinder section 17, see Fig. 1.

Connected to the rear end 25 of chamber 26 and spaced from the raw product inlet, not shown, is an inlet 29 for compressed air or fluid, shown in dotted line in Fig. 4. A pressure gauge 27 is mounted forward of hood section 15 to indicate pressure of the fluid being introduced into compartment 26a of chamber 26. If desired, a single inlet for the raw product and fluid may be provided at the rear end 25 of chamber 26.

The invention, in this particular instance, is directed more particularly to the combination of the chamber 26 and the dasher 18 rotatably disposed therein. The dasher 18, as seen more clearly in Figs. 2–8, comprises an agitating portion 31 and a drumlike portion 32, both portions being in coaxial alignment. Agitating portion 31, which is disposed in compartment 26a of chamber 26 is substantially skeletal in construction and comprises a plurality of elongated ribs 33 which are arranged in symmetrical-spaced relation with respect to the axis of rotation of the dasher and integrally connected at one end to an end face 34 of drumlike portion 32. The opposite ends of the ribs 33 are integrally connected to an end plate 35 which is spaced a predetermined distance from and is substantially parallel with end face 34 of dasher portion 32. Removably secured to the ribs 33 are a plurality of elongated scraper blades 36 which are disposed in substantially parallel relation with respect to the axis of rotation of the dasher and extend substantially the axial length of dasher portion 31. The blades 36 extend angularly outwardly from the periphery of portion 31 and have the elongated terminating edges 37 thereof disposed adjacent the interior surface of cylindrical chamber 26. As the name implies, the scrapers 36 are adapted to prevent the accumulation of product on the interior surface of chamber 26 and to direct the product toward the axial center of the compartment 26a. The elongated edges 37 of the scraper blades 36 are beveled, in this instance, to effect more readily, scraping of the interior surface of chamber 26. The opposite elongated edge of each blade 36 is provided with a plurality of longitudinally spaced tongues 36a which are adapted to be slidably seated within elongated slots 33a formed in each rib 33. Thus, to effect engagement of the blade with a rib requires that the tongues 36a be first inserted through the enlarged ends of the slots and then moved longitudinally of the rib to the narrowed slot end. Disposed within the space encompassed by ribs 33 is an impeller assembly 38, see Fig. 8, which is adapted to rotate about a fixed axis offset with respect to the axis of rotation of the dasher.

The end plate 35 is provided with a plurality of symmetrically arranged, radially extending lugs 35a which are adapted to slidably engage the interior surface of compartment 26a and properly align the dasher therein only upon assembly of the dasher in the compartment. The plate 35 is also provided with a hub 40 which extends axially from the exposed face thereof through a bearing, not shown, formed in the rear end 25 of chamber 26 and into hood section 15. The outer end 41 of the hub 40 is splined so as to facilitate rotational driving force being applied thereto. The hub 40 is provided with a center bore 42 which is adapted to receive a male connection provided on the power input or drive shaft, not shown, which is disposed within hood section 15, upon assembly of the dasher in the cylinder section 17. The inner end of hub 40, that is to say, the end adjacent the impeller assembly 38, has protruding axially therefrom a stud 43 which is rotatably encompassed by a connecting piece 46, which has a depending portion from which transversely extends an axle or shaft 47 about which the impeller or agitator 49 is free to rotate. The opposite end of axle 47 terminates within a second connecting piece 48, which, in turn, is keyed to the end of a shaft 50. The shaft 50 is coaxial with stud 43 and is disposed within an elongated center bore 56 formed in the drumlike portion 32 of the dasher 18. The opposite end 51 of the shaft 50 protrudes beyond the front side of dasher portion 32 and into the end plate 17a. Shaft end 51 is faceted to permit ready gripping thereof and to prevent rotation of said shaft. Disposed in axially spaced relation within bore 56 is a pair of bearing bushings 52 which encompass shaft 50. A spacer sleeve 52a is provided at one end of shaft 50 between bushing 52 and connecting piece 48, and adjacent the other end 51 of shaft 50 is a retaining washer 52b which maintains the bushings in assembled relation on shaft 50. By reason of the integral connection between ribs 33 of the agitating portion 31 and the drumlike portion 32 of the dasher, both portions 31 and 32 are adapted to rotate as a unit within the interior of chamber 26 about fixed coaxially aligned shaft 50. As heretofore mentioned, upon rotation of the dasher, the scraper blades 36 attached to ribs 33 effect agitation of the raw product introduced into compartment 26a and direct such product against the impeller 49 whereby the latter rotates and effects greater agitation of the product.

The impeller 49 is formed of a plurality of symmetrically disposed vanes 53 which are in parallel relation with respect to axle 47. The vanes 53 are maintained in symmetrical-spaced relation about axle 47 by a pair of spider end plates 54 which are integral with said vanes and spaced inwardly from the ends thereof. Each end plate is provided with a center opening through which the shaft 47 is adapted to pass. Disposed within the center opening of each plate 54 is a bearing bushing 55 which permits the impeller to rotate freely about axle 47.

The drumlike portion 32 of the dasher is substantially cylindrical in configuration and has the periphery thereof provided with relatively spaced, longitudinally extending facets 57. Protruding radially from each facet and disposed in axially spaced relation thereon, are a plurality of posts 58. Removably secured to the distal ends of each set of posts is a relatively flat scraper blade 60 which has provided along one edge thereof a plurality of longitudinally spaced openings 60a, through which the ends of the posts protrude.

The blades 60 extend angularly from the periphery of dasher portion 32 into a passage 61 formed between the periphery of dasher portion 32 and the interior of compartment 26b. Passage 61 is relatively small in cross section, and, thus, when the aerated product is caused to pass therethrough in a direction axially of the dasher, the temperature of the product is uniformly lowered to a predetermined temperature which will provide desired uniform overrun for the product which is subsequently removed by pump 21 from the end of compartment 26b adjacent end plate 17a. The blades 60 prevent the accumulation or adherence of the aerated product on the interior surface of compartment 26b. The blades 60 produce only mild agitation of the product when passing through passage 61 and, thus, do not adversely affect the overrun control of the resultant product and produce only minimum protein destabilization in the resultant product.

By reason of the aforementioned novel construction of dasher 18, a unique process may be practiced in producing ice cream or other frozen confections wherein the incorporation of air or similar fluid within the raw product must be accurately controlled. Thus, the new process provides for the mix or raw product to be introduced into the rear end of compartment 26a and, simultaneously therewith, the introduction of a predetermined amount of compressed air or fluid. The raw product and air is then thoroughly mixed by the agitating portion 31 of the dasher. Upon initial introduction of the raw product into refrigerated compartment 26a, the mix or raw product has a sensible heat loss from 40° F. to 29° F. During the agitation of the mix, the latter is further cooled to approximately 23° F., while latent heat of the mix is being removed. It is while the mix is within the range from 29° F. to 23° F. that optimum aeration of the mix is accomplished with but a minimum of agitation. From the agitation portion 31 of the dasher, the aerated mix is deflected by end face 34 to pass through the passage 61, heretofore described, wherein the mix is further cooled and more latent heat thereof given up until the product has attained its desired hardness before being discharged from the chamber through pump 21. By controlling the temperature of refrigerant circulated in enveloping passageway 28, the amount of refrigeration produced in chamber 26 may be accurately controlled so that the hardness of the resultant product may be varied, if desired.

The foregoing description of the improved apparatus and method has been confined by way of illustration to ice cream or other similar frozen confections; however, it is to be understood, of course, that the improved apparatus and method may be utilized in the freezing or chilling of lard or lard substitutes, margarine and analogous products, wherein a fluid is to be incorporated into the product and such incorporation is to be accurately controlled.

Thus, it will be seen that a method and apparatus for the continuous production of a refrigerated product has been disclosed which permits accurate control of the overrun and optimum incorporation of fluid into the product with but a minimum of agitation thereof, thereby eliminating or materially reducing protein destabilization in the resultant product. In addition, the improved method and apparatus permits variation in the degree of hardness of the resultant refrigerated product.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

I claim:

1. A freezing apparatus for ice cream mix or the like comprising an elongated first refrigerated compartment having a relatively large cross-sectional area through which the mix initially passes; power actuated first means movably mounted within said first compartment for simultaneously aerating and vigorously agitating substantially the entire volume of mix contained within said first compartment as the mix moves longitudinally through said first compartment toward one end thereof; an elongated second compartment having a refrigerated interior surface, said second compartment being serially connected to said first compartment one end; elongated second means mounted for relative rotational movement within said second compartment, the longitudinal dimensions of said second means and said second compartment being substantially the same, the periphery of said second means being disposed in close proximity to the refrigerated interior surface of said second compartment and cooperating therewith to form a restrictive elongated passageway of relatively small cross-sectional area and in enveloping relation with said second means and through which the mix is caused to pass in a relatively quiescent state to effect uniform reduction in temperature and controlled overrun of the mix; and third means mounted on the periphery of said second means and in slidable contact with said second compartment interior surface to prevent adhesion of the mix thereon.

2. A freezing apparatus for ice cream mix or the like comprising an elongated first refrigerated compartment having a relatively large cross-sectional area through which the mix initially passes, a mix inlet communicating with one end of said compartment, an air inlet communicating with said compartment one end, power actuated first means movably mounted within said first compartment and spanning the longitudinal dimension thereof for simultaneously aerating and vigorously agitating the mix throughout longitudinal travel thereof toward the second end of said compartment, an elongated second compartment having a refrigerated interior surface, said second compartment being serially connected to said first compartment second end, and power actuated elongated second means rotatably mounted within said second compartment and extending longitudinally substantially the entire length thereof, the periphery of said second means being spaced from and conforming substantially to the contour of the interior surface of said second compartment and forming a restrictive passageway of relatively small cross-sectional area enveloping said second means and through which the mix in a relatively quiescent state is caused to travel from said first compartment and effect uniform reduction in temperature and controlled overrun of the mix, said second means including means cooperating with said second compartment interior surface to prevent adhesion of the mix thereon.

3. A freezing apparatus for ice cream mix or the like comprising a housing provided with an elongated chamber having a refrigerated interior surface, a mix inlet communicating with one end portion of said chamber, an air inlet communicating with said chamber one end portion, mix impeller means rotatably mounted within said chamber and extending longitudinally the full length thereof, said impeller means cooperating with said chamber refrigerated interior surface to form a pair of serially connected compartments, the first compartment, adjacent said chamber one end, having a relatively large cross-sectional area and through which the mix is caused to pass longitudinally and be simultaneously aerated and vigorously agitated by a first segment of said impeller means, the second compartment being a restrictive passageway of relatively small cross-sectional area and in enveloping relation with a second segment of said impeller means and through which the mix is caused to pass in a relatively quiescent state to effect uniform reduction in temperature and controlled overrun thereof; means carried by the second segment of said impeller means and cooperating with the interior surface of said second compartment to prevent adhesion of the mix on said surface.

4. A freezing apparatus for ice cream mix or the like, comprising an elongated first refrigerated compartment having a relatively large cross-sectional area through which the mix initially passes; power-actuated first means movably mounted within said first compartment for simultaneously aerating and vigorously agitating substantially the entire volume of mix contained within said first compartment as the mix moves longitudinally through said first compartment toward one end thereof, said first means including an elongated rotatable hollow skeletal frame, a plurality of elongated relatively spaced pieces removably secured to, and extending angularly from, the outer periphery of said frame and cooperating with said first compartment interior surface to prevent adherence of the mix on the latter, and an elongated freely rotatable agitator encompassed by said skeletal frame, the axis of rotation of said agitator being eccentrically disposed and parallel with respect to the rotatable axis of said frame; an elongated second compartment having a refrigerated interior surface, said second compartment being serially connected to said first compartment one end; and elongated second means mounted for relative rotational movement within said second compartment, the longitudinal dimensions of said second means and said second compartment being substantially the same as the periphery of said second means cooperating with the refrigerated interior surface of said second compartment to form a restrictive passageway of relatively small cross-sectional area through which the mix is caused to pass in a relatively quiescent state to effect uniform reduction in temperature and controlled overrun of the mix; said second means having portions thereof in slidable contact with said second compartment interior surface to prevent adhesion of the mix thereon.

References Cited in the file of this patent

UNITED STATES PATENTS

| | | |
|---|---|---|
| 2,056,431 | Light | Oct. 6, 1936 |
| 2,132,364 | Thompson | Oct. 4, 1938 |
| 2,210,366 | Godfrey | Aug. 6, 1940 |
| 2,211,387 | Routh | Aug. 13, 1940 |
| 2,278,340 | Weinrich | Mar. 31, 1942 |
| 2,281,944 | Miller | May 5, 1942 |
| 2,316,845 | Craft | Apr. 20, 1943 |
| 2,535,462 | Stoelting | Dec. 26, 1950 |
| 2,689,113 | Merrill | Sept. 14, 1954 |